United States Patent
Kandel et al.

(10) Patent No.: US 11,409,519 B2
(45) Date of Patent: Aug. 9, 2022

(54) METHOD AND APPARATUS FOR IMPLEMENTING A UI MODERNIZATION APPLICATION MODULE

(71) Applicant: JPMorgan Chase Bank, N.A., New York, NY (US)

(72) Inventors: Stacy Newman Kandel, Easton, PA (US); Oleg Uris, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/316,211

(22) Filed: May 10, 2021

(65) Prior Publication Data
US 2021/0349711 A1    Nov. 11, 2021

Related U.S. Application Data

(60) Provisional application No. 63/021,801, filed on May 8, 2020.

(51) Int. Cl.
G06F 8/71        (2018.01)
G06F 16/245      (2019.01)

(52) U.S. Cl.
CPC ............. *G06F 8/71* (2013.01); *G06F 16/245* (2019.01)

(58) Field of Classification Search
CPC . G06F 8/71; G06F 16/245; G06F 8/38; G06F 9/451; G06F 8/34; G06F 3/0482; G06N 20/00
See application file for complete search history.

(56) References Cited

U.S. PATENT DOCUMENTS

| | | |
|---|---|---|
| 9,361,092 B1 | 6/2016 | Bai et al. |
| 2003/0009740 A1 | 1/2003 | Lan |
| 2003/0018573 A1 | 1/2003 | Comas et al. |

(Continued)

OTHER PUBLICATIONS

Kim Herzig et al.; The Impact of Tangled Code Changes; IEEE; pp. 121-130; retrieved on Jan. 10, 2022 (Year: 2013).*

(Continued)

*Primary Examiner* — S. Sough
*Assistant Examiner* — Cuong V Luu
(74) *Attorney, Agent, or Firm* — Greenblum & Bernstein, P.L.C.

(57) ABSTRACT

Various methods, apparatuses/systems, and media for implementing a UI modernization application module. A receiver receives a request to implement a new feature into a current application. A processor accesses a database to receive statistical data of current source codes and components corresponding to the current application. The processor determines whether an impact value regarding an impact on the current source codes in implementing the new feature into the current application exceeds a predetermined threshold value. When it is determined that the impact value exceeds the predetermined threshold value, the processor determines whether current application development could run in parallel with a new version of the application if the new feature is implemented into the current application. When it is determined that current application development could run in parallel with the new version of the application, the processor implements the new feature into the current application.

17 Claims, 6 Drawing Sheets

(56) References Cited

U.S. PATENT DOCUMENTS

| | | |
|---|---|---|
| 2005/0066019 A1 | 3/2005 | Egan et al. |
| 2010/0153908 A1* | 6/2010 | Sarkar .................... G06Q 99/00 |
| | | 717/104 |
| 2010/0306750 A1* | 12/2010 | Helovuo ................ G06F 8/456 |
| | | 717/143 |
| 2013/0212556 A1 | 8/2013 | Heyhoe et al. |

OTHER PUBLICATIONS

Steffen Olbrich et al.; The Evolution and Impact of Code Smells A Case Study of Two Open Source Systems; IEEE; pp. 390-400; retrieved on Jan. 10, 2022 (Year: 2009).*

Official communication received in PCT Application No. PCT/US 2021/031578 dated Aug. 18, 2021.

* cited by examiner

METHOD AND APPARATUS FOR IMPLEMENTING A UI MODERNIZATION APPLICATION MODULE

CROSS-REFERENCE TO RELATED APPLICATIONS

This application claims the benefit of priority from U.S. Provisional Patent Application No. 63/021,801, filed May 8, 2020, which is herein incorporated by reference in its entirety.

TECHNICAL FIELD

This disclosure generally relates to user interface (UI) modernization application, and, more particularly, to methods and apparatuses for implementing a UI modernization application module that is configured to obtain feedback data regarding implementing a new feature into a current application, thereby improving functionality and efficiency (via support and maintenance) of the current application.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, across the multiple lines of businesses (LOB) at an organization, UI developers are assigned stories or tasks to build or extend features and/or functionality on applications that are considered to be legacy and outdated. In many cases, the cost to extend these applications, using antiquated technologies, may be considerably high from a support and maintenance standpoint. Traditionally, an application development team may continuously work on patching and adding on to outdated UI frameworks. With continuing to develop on sunset and/or outdated technologies, the application development team may experience slower speed m delivery of an application; the system may experience vulnerabilities in the security of the application; and the organization may drive up costs to support and maintain these application programs.

In addition, in many teams, developers may not feel empowered to make decisions to improve overall efficiencies in the software development life cycle (SDLC). It may be desired that teams should be looking at ways to be more effective by looking to improve process and technologies that would be easier to support, extend and integrate with toolkit libraries and better meet ADA requirements. Without making needed changes in a tech stack, an organization may continue to create tech debt every day that may add more complexities and issues to current applications. This may prove to make these applications more difficult to maintain and hold developers back from learning new skills to keep them relevant in this rapidly changing technology arena.

SUMMARY

The present disclosure, through one or more of its various aspects, embodiments, and/or specific features or sub-components, may provide, among others, various systems, servers, devices, methods, media, programs, and platforms for implementing a UI modernization application module for obtaining feedback data regarding implementing a new feature into a current application based on several key data, including but not limited thereto, current technology stack data, current ADA implementation data, current team skills set data, time estimate data on conversion of the application and components, and team size data, thereby improving functionality and efficiency (via support and maintenance) of the current application.

According to an aspect of the present disclosure, a method for implementing a UI modernization application module by utilizing one or more processors and one or more memories is disclosed. The method may include: receiving a request to implement a new feature into a current application; accessing a database that stores current source codes and components associated with the current application; receiving statistical data of the current source codes and the components from the database corresponding to the current application; determining whether an impact value regarding an impact on the current source codes in implementing the new feature into the current application exceeds a predetermined threshold value; when it is determined that the impact value exceeds the predetermined threshold value, determining whether current application development could run in parallel with a new version of the application if the new feature is implemented into the current application; and when it is determined that current application development could run in parallel with the new version of the application, implementing the new feature into the current application.

According to another aspect of the present disclosure, wherein, when it is determined that the current application development could not run in parallel with the new version of the application, the method may further include: re-prioritizing current backlog data regarding application development; and implementing the new feature into the current application based on the re-prioritized backlog data.

According to yet another aspect of the present disclosure, the method may further include: requesting additional development resource data; and implementing the new feature into the current application based on the additional development resource data.

According to further aspect of the present disclosure, wherein the predetermined threshold value is a value that represents about 70% impact on the current source codes, but the disclosure is not limited thereto.

According to yet another aspect of the present disclosure, wherein, when it is determined that the impact value is less than the predetermined threshold value, the method may further include: determining whether the new feature includes multiple connected interactive components; and implementing the new feature into the current application when it is determined that the new feature includes multiple connected interactive components.

According to an additional aspect of the present disclosure, wherein, when it is determined that the impact value is less than the predetermined threshold value, the method may further include: determining whether the new feature includes multiple connected interactive components; receiving web-components from UI toolkit when it is determined that the new feature does not include multiple connected interactive components; and implementing the new feature into the current application based on the received web-components.

According to a further aspect of the present disclosure, wherein, when it is determined that an amount of source code to be developed and tested for building the new version of the application is more than two times the current source codes, the method may further include: determining whether the current application development could run in parallel with the new version of the application if the new feature is implemented into the current application; and when it is determined that the current application development could run in parallel with the new version of the application, implementing the new feature into the current application.

According to yet another aspect of the present disclosure, a system for implementing a UI modernization application module is disclosed. The system may include a database including memories that store current source codes and components associated with a current application, and a processor that is coupled to the database via a communication network. The processor may be configured to: receive a request to implement a new feature into the current application; access the a database to receive statistical data of the current source codes and the components from the database corresponding to the current application; determine whether an impact value regarding an impact on the current source codes in implementing the new feature into the current application exceeds a predetermined threshold value; when it is determined that the impact value exceeds the predetermined threshold value, determine whether current application development could run in parallel with a new version of the application if the new feature is implemented into the current application; and when it is determined that current application development could run in parallel with the new version of the application, implement the new feature into the current application.

According to another aspect of the present disclosure, wherein, when it is determined that the current application development could not run in parallel with the new version of the application, the processor may be further configured to: re-prioritize current backlog data regarding application development; and implement the new feature into the current application based on the re-prioritized backlog data.

According to yet another aspect of the present disclosure, the processor may be further configured to: request additional development resource data; and implement the new feature into the current application based on the additional development resource data.

According to yet another aspect of the present disclosure, wherein, when it is determined that the impact value is less than the predetermined threshold value, the processor may be further configured to: determine whether the new feature includes multiple connected interactive components; and implement the new feature into the current application when it is determined that the new feature includes multiple connected interactive components.

According to an additional aspect of the present disclosure, wherein, when it is determined that the impact value is less than the predetermined threshold value, the processor may be further configured to: determine whether the new feature includes multiple connected interactive components; receive web-components from UI toolkit when it is determined that the new feature does not include multiple connected interactive components; and implement the new feature into the current application based on the received web-components.

According to yet another aspect of the present disclosure, when it is determined that an amount of source code to be developed and tested for building the new version of the application is more than two times the current source codes, the processor may be further configured to: determine whether the current application development could run in parallel with the new version of the application if the new feature is implemented into the current application; and when it is determined that the current application development could run in parallel with the new version of the application, implement the new feature into the current application.

According to a further aspect of the present disclosure, a non-transitory computer readable medium configured to store instructions for implementing a UI modernization application module is disclosed. The instructions, when executed, may cause a processor to perform the following: receiving a request to implement a new feature into a current application; accessing a database that stores current source codes and components associated with the current application; receiving statistical data of the current source codes and the components from the database corresponding to the current application; determining whether an impact value regarding an impact on the current source codes in implementing the new feature into the current application exceeds a predetermined threshold value; when it is determined that the impact value exceeds the predetermined threshold value, determining whether current application development could run in parallel with a new version of the application if the new feature is implemented into the current application; and when it is determined that current application development could run in parallel with the new version of the application, implementing the new feature into the current application.

According to another aspect of the present disclosure, wherein, when it is determined that the current application development could not run in parallel with the new version of the application, the instructions, when executed, may further cause the processor to perform the following: re-prioritizing current backlog data regarding application development; and implementing the new feature into the current application based on the re-prioritized backlog data.

According to yet another aspect of the present disclosure, the instructions, when executed, may further cause the processor to perform the following: requesting additional development resource data; and implementing the new feature into the current application based on the additional development resource data.

According to yet another aspect of the present disclosure, wherein, when it is determined that the impact value is less than the predetermined threshold value, the instructions, when executed, may further cause the processor to perform the following: determining whether the new feature includes multiple connected interactive components; and implementing the new feature into the current application when it is determined that the new feature includes multiple connected interactive components.

According to an additional aspect of the present disclosure, wherein, when it is determined that the impact value is less than the predetermined threshold value, the instructions, when executed, may further cause the processor to perform the following: determining whether the new feature includes multiple connected interactive components; receiving web-components from UI toolkit when it is determined that the new feature does not include multiple connected interactive components; and implementing the new feature into the current application based on the received web-components.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
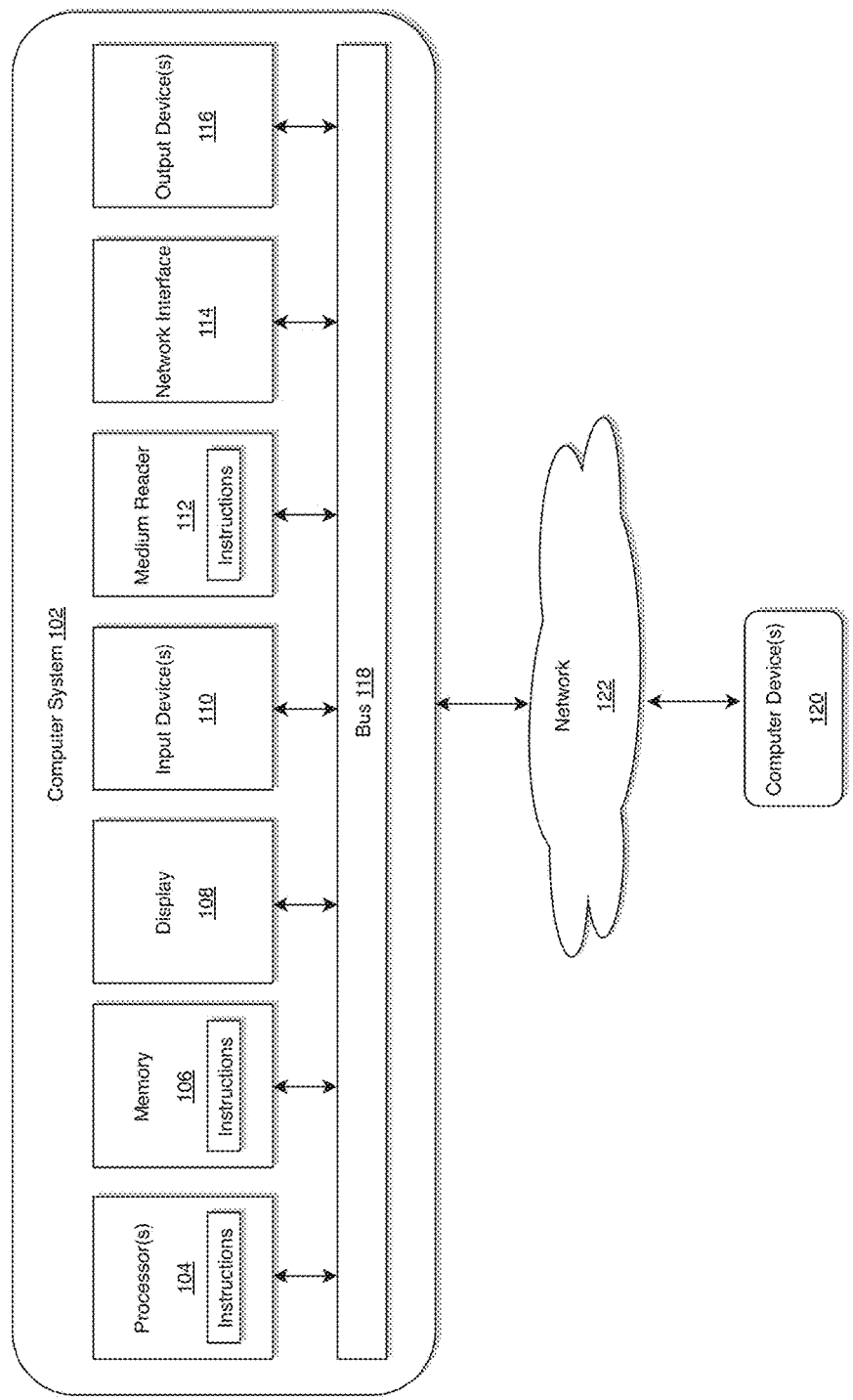
FIG. 1 illustrates a computer system for implementing a UI modernization application module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines, tools, devices and/or modules. Those skilled in the art will appreciate that these blocks, units, engines, tools, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, tools, devices, and/or modules being implemented by microprocessors or similar, they may be programmed using software (e.g., microcode) to perform various functions discussed herein and may optionally be driven by firmware and/or software. Alternatively, each block, unit, engine, tool device, and/or module may be implemented by dedicated hardware, or as a combination of dedicated hardware to perform some functions and a processor (e.g., one or more programmed microprocessors and associated circuitry) to perform other functions. Also, each block, unit, engine, tool, device, and/or module of the example embodiments may be physically separated into two or more interacting and discrete blocks, units, engines, tools, devices, and/or modules without departing from the scope of the inventive concepts. Further, the blocks, units, engines, tools, devices, and/or modules of the example embodiments may be physically combined into more complex blocks, units, engines, tools, devices, and/or modules without departing from the scope of the present disclosure.

Terms such as "substantially," "about," or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global, positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and me not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a UI modernization application module for obtaining feedback data regarding implementing a new feature into a current application based on several key data, including but not limited thereto, current technology stack data, current ADA implementation data, current team skills set data, time estimate data on conversion of the application and components, and team size data, thereby improving functionality of a current application, but the disclosure is not limited thereto.

Figure 2:
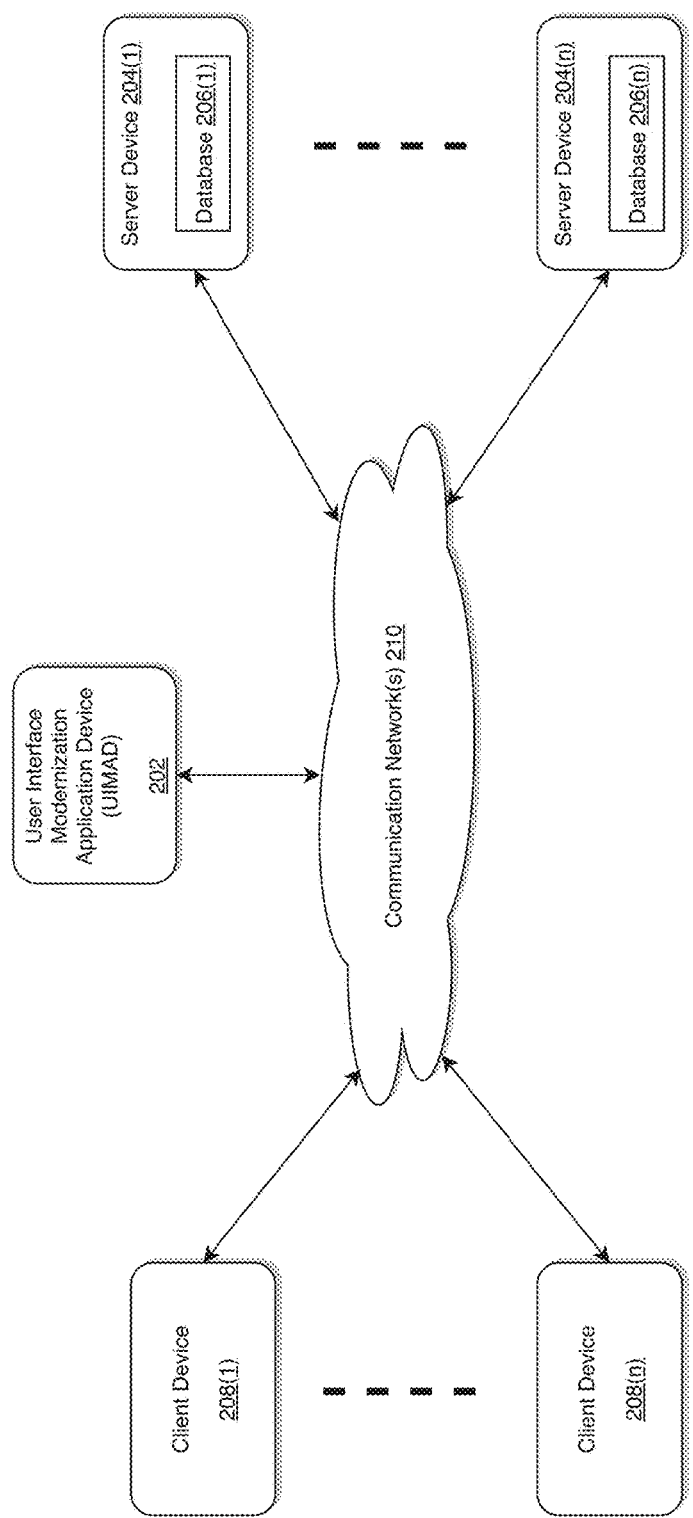
FIG. 2 illustrates an exemplary network diagram of a UI modernization application device in accordance with an exemplary embodiment.

Referring to FIG. 2, a schematic of an exemplary network environment 200 for implementing a UI modernization application device (UIMAD) of the instant disclosure is illustrated.

Conventional system, that does not implement a UIMAD of the instant disclosure, may not be able to provide feedback data regarding implementing a new feature into a current application.

According to exemplary embodiments, the above-described problems associated with conventional system may be overcome by implementing a UIMAD 202 having a UI modernization application module as illustrated in FIG. 2 to obtain feedback data regarding implementing a new feature into a current application based on several key data, including but not limited thereto, current technology stack data, current ADA implementation data, current team skills set data, time estimate data on conversion of the application and components, and team size data, thereby improving functionality of a current application, but the disclosure is not limited thereto.

The UIMAD 202 may be the same or similar to the computer system 102 as described with respect to FIG. 1.

The UIMAD 202 may store one or more applications that can include executable instructions that, when executed by the UIMAD 202, cause the UIMAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the applications), and even the UIMAD 202 itself, may be located in virtual server(s) running in a cloud-based computing environment rather than being tied to one or more specific physical network computing devices. Also, the applications) may be running in one or more virtual machines (VMs) executing on the UIMAD 202. Additionally, in one or more embodiments of this technology, virtual machine(s) running on the UIMAD 202 may be managed or supervised by a hypervisor.

In the network environment 200 of FIG. 2, the UIMAD 202 is coupled to a plurality of server devices 204(1)-204(n) that hosts a plurality of databases 206(1)-206(n), and also to a plurality of client devices 208(1)-208(n) via communication network(s) 210. A communication interface of the UIMAD 202, such as the network interface 114 of the computer system 102 of FIG. 1, operatively couples and communicates between the UIMAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the UIMAD 202, the server devices 204(1)-204(n), and/or the client devices 208(1)-208(n) may be coupled together via other topologies. Additionally, the network environment 200 may include other network devices such as one or more routers and/or swatches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The UIMAD 202 may be a standalone device or integrated with one or more other devices or apparatuses, such as one or more of the server devices 204(1)-204(n), for example. In one particular example, the UIMAD 202 may be hosted by one of the server devices 204(1)-204(n), and other arrangements are also possible. Moreover, one or more of the devices of the UIMAD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the UIMAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the UIMAD 202 that may be configured for automatically collating data from multiple different source systems into one self-service dashboard, thereby significantly improving release management process and reducing release time, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the UIMAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the UIMAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the UIMAD 202, the server devices 204(1)-204(n), or the client devices 208(1)-208(n), for example, may be configured to operate as virtual instances on the same physical machine. For example, one or more of the UIMAD 202, the server devices 204(1)-204(n), or the client devices 208(1)-208(n) may operate on the same physical device rather than as separate devices communicating through communication network(s) 210. Additionally, there may be more or fewer UIMADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
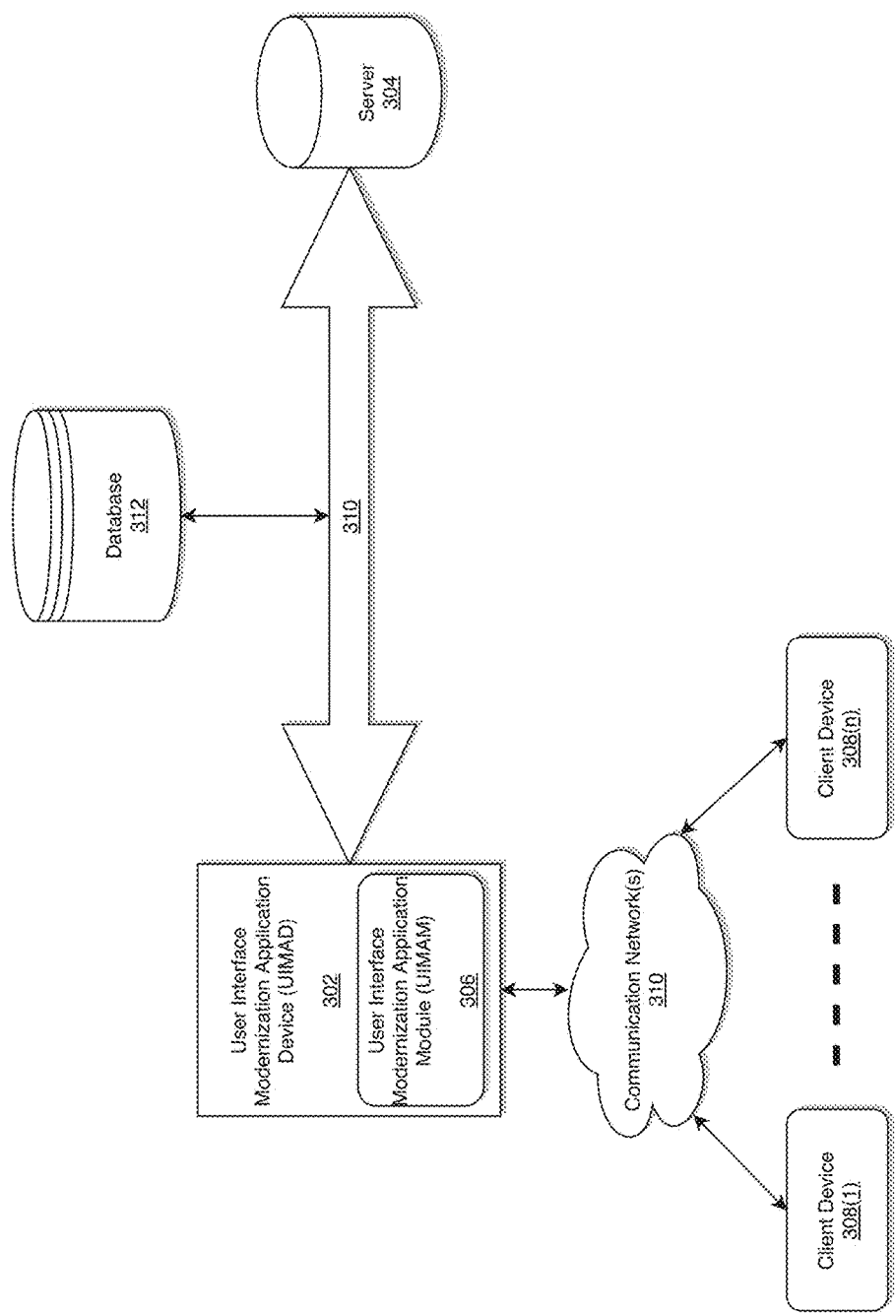
FIG. 3 illustrates a system diagram for implementing a UI modernization application device with a UI modernization application module in accordance with an exemplary embodiment.

FIG. 3 illustrates a system diagram for implementing a UIMAD with a UI modernization application module (UI-MAM) in accordance with an exemplary embodiment.

As illustrated in FIG. 3, in the system 300, according to exemplary embodiments, the UIMAD 302 including the UIMAM 306 may be connected to a server 304 and a database 312 via a communication network 310, but the disclosure is not limited thereto. For example, according to exemplary embodiments, the UIMAM 306 may be connected to any desired database besides the database 312.

According to exemplary embodiments, the database 312 may include memories that may store current source codes and components associated with a current application, but the disclosure is not limited thereto.

According to exemplary embodiments, UIMAM 306 may be web application which may be configured to produce recommendations for new feature development, and the application modernization may be based on two artifacts, but the disclosure is not limited thereto: current source code repository (i.e., a database) which may be accessible for UIMAM 306 (e.g., uniform resource locator (URL) to Bitbucket, but the disclosure); a breakdown of low level components (e.g., UI components vs technology traceability matrix) required for this feature implementation.

An exemplary UI Components vs Technology traceability matrix may be represented as the table below:

TABLE I

|  | Angular 1 | | Angular 2 | | Angular 4 | | Vue | | Ember | | ExtJS | | Vaadin | | Flex | | React | |
| --- | --- | --- | --- | --- | --- | --- | --- | --- | --- | --- | --- | --- | --- | --- | --- | --- | --- | --- |
|  | Loc | Est | Loc | Est | Loc | Est | Loc | Est | Loc | Est | Loc | Est | Loc | Est | Loc | Est | Loc | Est |
| Standard Grid | 500 | 5d | | | | | | | | | | | | | | | | |
| Complex grid | | | | | | | | | | | | | | | | | | |
| Chart | | | | | | | | | | | | | | | | | | |
| Form up to 5 fields | | | | | | | | | | | | | | | | | | |
| Form up to 10 fields | | | | | | | | | | | | | | | | | | |
| Complex form | | | | | | | | | | | | | | | | | | |
| Responsive layout | | | | | | | | | | | | | | | | | | |
| Master details panel layout | | | | | | | | | | | | | | | | | | |
| Navigation | | | | | | | | | | | | | | | | | | |

TABLE I-continued

| | Angular 1 | | Angular 2 | | Angular 4 | | Vue | | Ember | | ExtJS | | Vaadin | | Flex | | React | |
|---|---|---|---|---|---|---|---|---|---|---|---|---|---|---|---|---|---|---|
| | Loc | Est | Loc | Est | Loc | Est | Loc | Est | Loc | Est | Loc | Est | Loc | Est | Loc | Est | Loc | Est |
| Tiles | | | | | | | | | | | | | | | | | | |
| Browser support | | | | | | | | | | | | | | | | | | |

As illustrated in Table 1 above, data for Angular 1 in the Standard Grid is illustrated as an example. This components table may be filled in by receiving data from different technologies to assist in sizing estimates in the technology. According to exemplary embodiments, the UIMAM 306 may be configured to define the components and the technologies, but the disclosure is not limited thereto. For example, according to exemplary embodiments, the UIMAM 306 may be configured to get the sizings in order to incorporate into the algorithm for critical mass of the application technology/code base. The above Table 1 illustrates an exemplary outline framework without departing from the scope of the instant disclosure.

Figure 5A:
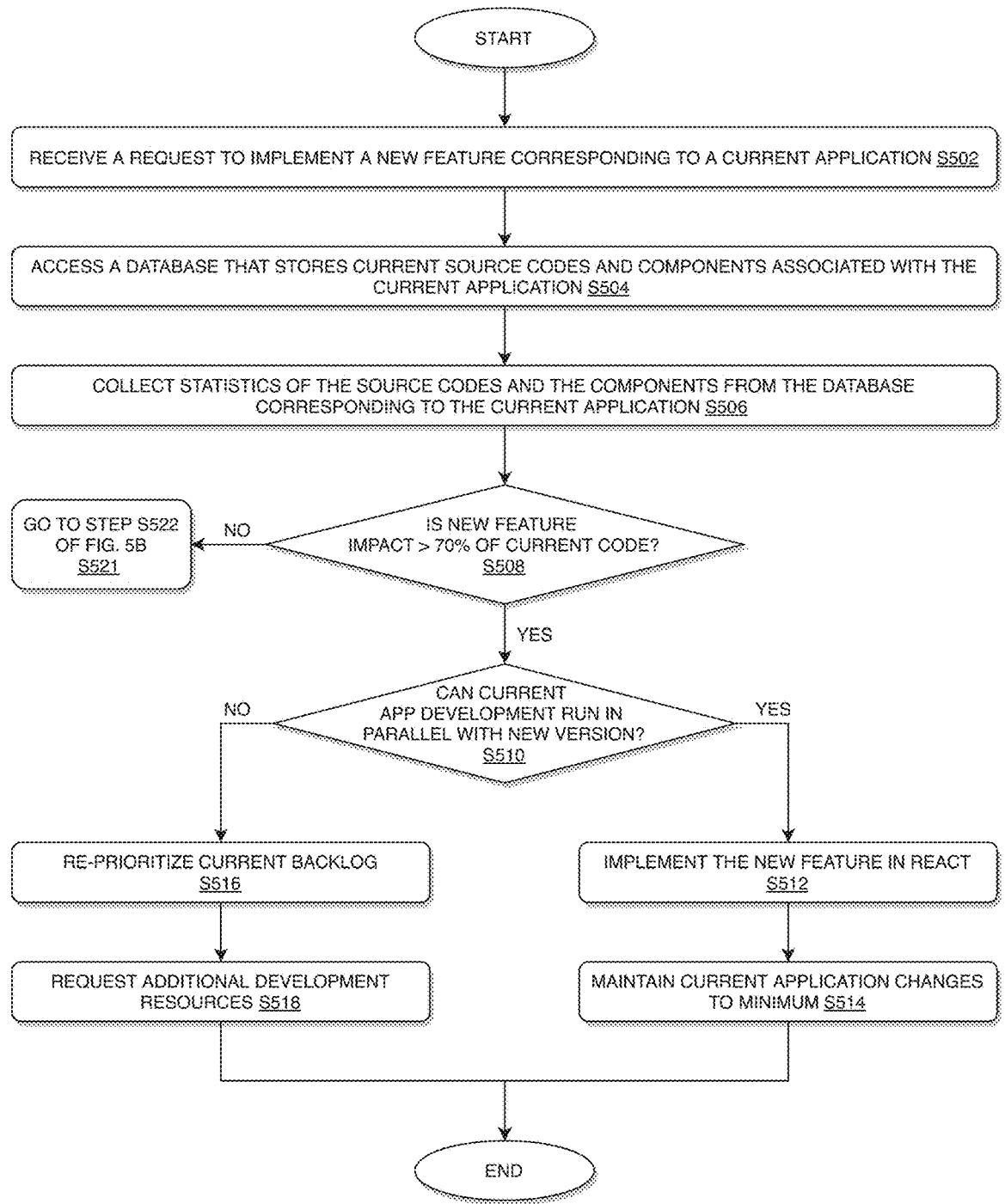
FIG. 5A illustrates a flow chart for implementing a UI modernization application module in accordance with an exemplary embodiment.
Figure 5B:
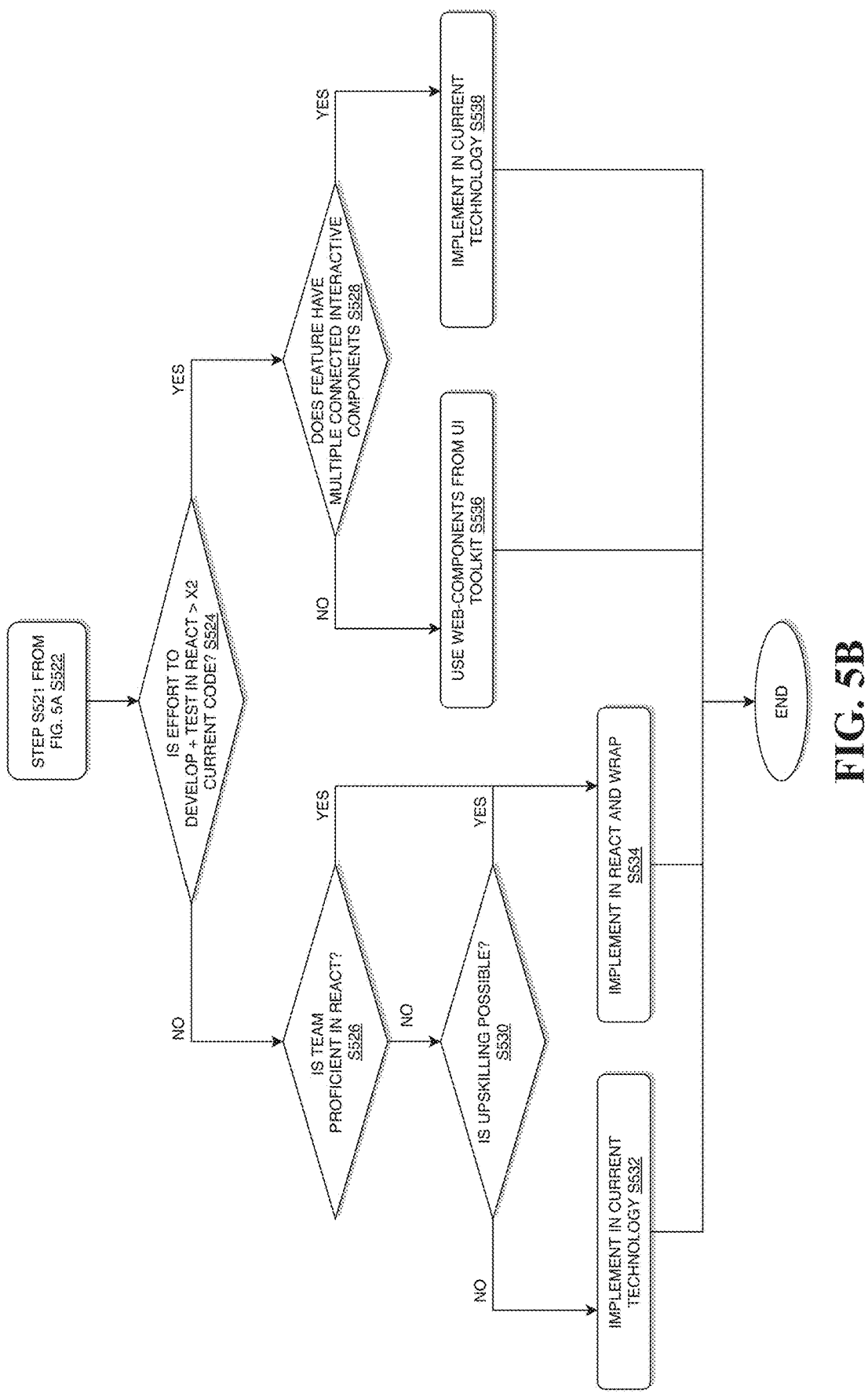
FIG. 5B illustrates another flow chart for implementing a UI modernization application module in accordance with an exemplary embodiment.

According to exemplary embodiments, the UIMAM 306 may include the following modules, but the disclosure is not limited thereto: a code analyzer configured to crawl source code repository (e.g., database 312) and collect statistical data (e.g., lines of code, frameworks, etc.); a matrix of components vs frameworks implementation efforts and lines of code (UI components vs technology traceability matrix (e.g., Table 1); a questionnaire module configured to guide a user through several simple questions (e.g., four to five simple questions) to understand project phase, priority of modernization and team proficiency in new technology; and a machine learning model that may be configured to be trained to infer decision based on received inputs as described with respect to FIGS. 5A and 5B below. The machine learning model, according to exemplary embodiments, may also be configured to be trained to infer decision based on taxonomy of recommended learning material for modernization of a current application.

According to exemplary embodiment, the UIMAD 302 is described and shown in FIG. 3 as including the UIMAM 306, although it may include other rules, policies, modules, databases, or applications, for example. According to exemplary embodiments, the database 312 may be embedded within the UIMAD 302. According to exemplary embodiments, the server 304 may also be a database which may be configured to store information including the metadata, but the disclosure is not limited thereto. According to exemplary embodiments, the UIMAM 306 may also be referred to as a processor.

According to exemplary embodiments, the UIMAM 306 may be configured to receive continuous feed of data from the server 304 and the database 312 via the communication network 310. According to exemplary embodiments, the UIMAM 306 may also be configured to communicate with the client devices 308(1)-308(n) (e.g., user's devices) via the communication network 310, but the disclosure is not limited thereto. According to exemplary embodiments, the client devices 308(1)-308(n) may also be referred to as buyer systems and/or supplier systems.

According to exemplary embodiments, artificial intelligence/Machine learning (AI/ML) models may be trained using CPUs and GPUs to infer decision based on received inputs as described with respect to FIGS. 5A and 5B below, but the disclosure is not limited thereto. The AI/ML models may also be trained to infer decision based on taxonomy of recommended learning material for modernization of a current application, but the disclosure is not limited thereto.

As will be described below, the UIMAM 306 may be configured to receive a request to implement a new feature into a current application; access a database that stores current source codes and components associated with the current application; receive statistical data of the current source codes and the components from the database corresponding to the current application; determine whether an impact value regarding an impact on the current source codes in implementing the new feature into the current application exceeds a predetermined threshold value; when it is determined that the impact value exceeds the predetermined threshold value, determine whether current application development could run in parallel with a new version of the application if the new feature is implemented into the current application; and when it is determined that current application development could run in parallel with the new version of the application, implement the new feature into the current application.

According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the client devices 308(1)-308(n) may communicate with the UIMAD 302 via broadband or cellular communication. Of course, these embodiments are merely exemplary and are not limiting or exhaustive.

Figure 4:
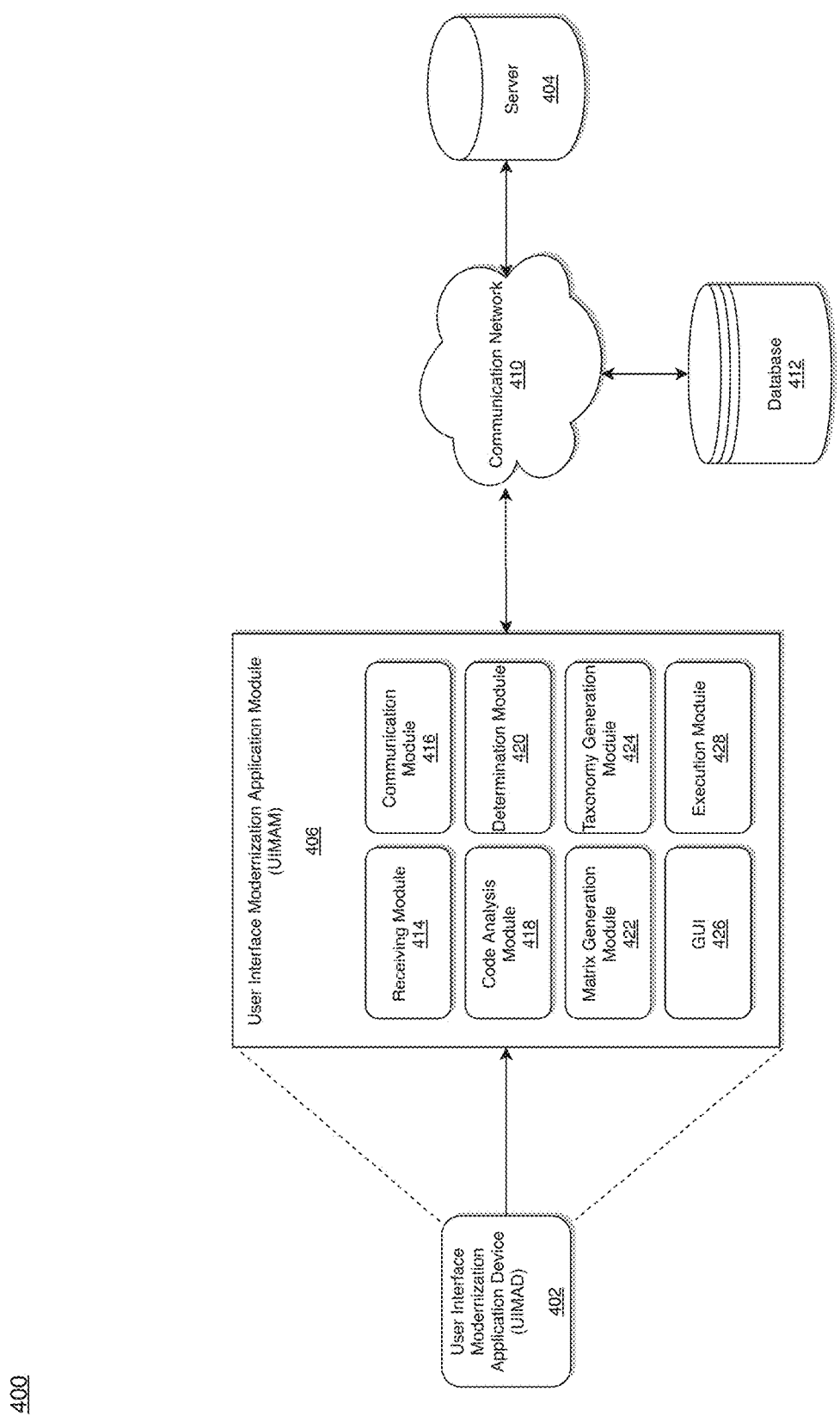
FIG. 4 illustrates a system diagram for implementing a UI modernization application module of FIG. 3 in accordance with an exemplary embodiment.

FIG. 4 illustrates a system diagram for implementing a UI modernization application module (UIMAM) of FIG. 3 in accordance with an exemplary embodiment. As illustrated in FIG. 4, the system 400 may include a UIMAD 402 within which a UIMAM 406 may be embedded, a database 412, a server 404, and a communication network 410.

According to exemplary embodiments, the database 412 may be same or similar to the database 312 as illustrated in FIG. 3. Further, the server 404 may be same or similar to the server 304 as illustrated in FIG. 3, and the communication network 410 may be same or similar to the communication network 310 as illustrated in FIG. 3.

As illustrated in FIG. 4, the UIMAM 406 may include a receiving module 414, a communication module 416, a code analysis module 418, a determination module 420, a matrix generation module 422, a taxonomy generation module 424, a GUI 426, and an execution module 428. According to exemplary embodiments, the UIMAM 406 may include various systems that are managed and operated by an organization by utilizing user's devices (not shown in FIG. 4).

The process may be executed via the communication network 410 which may comprise plural networks as described above. For example, in an exemplary embodiment, the various components of the UIMAM 406 may communicate with the database 412 and the server 404 via the communication module 416 and the communication network 410. Of course, these embodiments are merely exemplary and are not limiting or exhaustive.

According to exemplary embodiments, each of the receiving module 414, the communication module 416, the code analysis module 418, the determination module 420, the matrix generation module 422, the taxonomy generation module 424, and the execution module 428 may be implemented by microprocessors or similar, they may be programmed using software (e.g., microcode) to perform various functions discussed herein. Alternatively, each of the receiving module 414, the communication module 416, the code analysis module 418, the determination module 420, the matrix generation module 422, the taxonomy generation module 424, and the execution module 428 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the receiving module 414, the communication module 416, the code analysis module 418, the determination module 420, the matrix generation module 422, the taxonomy generation module 424, and the execution module 428 may be physically separated into two or more interacting and discrete blocks, units, engines, devices, and/or modules without departing from the scope of the inventive concepts.

Also, according to exemplary embodiments, each of the receiving module 414, the communication module 416, the code analysis module 418, the determination module 420, the matrix generation module 422, the taxonomy generation module 424, and the execution module 428 of the UIMAM 406 may be called via corresponding API.

According to exemplary embodiments, the communication module 416 establishes a link between the UIMAM 406 and the database 412 and the server 404 via the communication network 410. According to exemplary embodiments, the database 412 may include memories that may store current source codes and components associated with a current application, but the disclosure is not limited thereto. The receiving module 414 may be configured to access the database 412 via the communication module 416 and the communication network 410.

According to exemplary embodiments, the receiving module 414 may be configured to receive a request to implement a new feature into a current application and access the database 412 to obtain statistical data of current source codes and components corresponding to the current application.

According to exemplary embodiments, the code analysis module 418 may be configured to crawl the database 412 and collect statistical data (e.g., lines of code, frameworks, etc.) from the database 412 and send the information to the receiving module 414 via the communication module 416 and the communication network.

According to exemplary embodiments, the matrix generation module 422 may be configured to generate a matrix of components vs frameworks implementation efforts and lines of code (UI components vs technology traceability matrix (e.g., Table 1). The GUI 426 may be utilized to guide a user through several simple questions (e.g., four to five simple questions) to understand project phase, priority of modernization and team proficiency in new technology. The UIMAM 406 may be configured to generate a machine learning model that may be configured to be trained to infer decision based on received inputs as described with respect to FIGS. 5A and 5B below. The machine learning model, according to exemplary embodiments, may also be configured to be trained to infer decision based on taxonomy of recommended learning material for modernization of a current application generated by the taxonomy generation module 424.

According to exemplary embodiments, the determination module 420 may be configured to determine whether an impact value regarding an impact on the current source codes in implementing the new feature into the current application exceeds a predetermined threshold value. According to exemplary embodiments, the predetermined threshold value may be a value that represents about 70% impact on the current source codes, but the disclosure is not limited thereto. For example, according to exemplary embodiments, the predetermined threshold value may be value that represents about 75% impact on the current source codes, but the disclosure is not limited thereto. For example, according to exemplary embodiments, the predetermined threshold value may be value that represents about 80% impact on the current source codes, but the disclosure is not limited thereto. For example, according to exemplary embodiments, the predetermined threshold value may be value that represents about 85% impact on the current source codes, but the disclosure is not limited thereto. For example, according to exemplary embodiments, the predetermined threshold value may be value that represents about 90% impact on the current source codes, but the disclosure is not limited thereto.

According to exemplary embodiments, when the determination module 420 determines that the impact value exceeds the predetermined threshold value (i.e., more than 70%), the determination module 420 may further be configured to determine whether current application development could run in parallel with a new version of the application if the new feature is implemented into the current application.

According to exemplary embodiments, when the determination module 420 determines that current application development could run in parallel with the new version of the application, the execution module 428 may be configured to implement the new feature into the current application.

According to exemplary embodiments, when the determination module 420 determines that the current application development could not run in parallel with the new version of the application, the execution module 428 may be configured to re-prioritize current backlog data regarding application development and implement the new feature into the current application based on the re-prioritized backlog data.

According to exemplary embodiments, when the determination module 420 determines that the current application development could not run in parallel with the new version of the application, the UIMAM 406 may be configured to request additional development resource data and the execution module 428 may be configured to implement the new feature into the current application based on the additional development resource data received by the receiving module 414.

According to exemplary embodiments, when the determination module 420 determines that the impact value is less than the predetermined threshold value (i.e., less than 70%), the determination module 420 may be configured to determine whether the new feature includes multiple connected interactive components and the execution module 428 may be configured to implement the new feature into the current application when the determination module 420 determines that the new feature includes multiple connected interactive components.

According to exemplary embodiments, when the determination module 420 determines that the impact value is less than the predetermined threshold value, the determination module 420 may be further configured to determine whether the new feature includes multiple connected interactive components. The receiving module 414 may be configured to receive web-components from UI toolkit when the determination module 420 determines that the new feature does not include multiple connected interactive components and the execution module 428 may be configured to implement the new feature into the current application based on the received web-components.

According to exemplary embodiments, the determination module 420 may be configured to determine whether effort to develop and test in a JavaScript library for building user interfaces (i.e., React web framework) is more than two times the current source code corresponding to the current application or not. When the determination module 420 determines that the effort to develop and test in a JavaScript library for building user interfaces (i.e., React web framework) is more than two times the current source code corresponding to the current application, the determination module 420 may be configured to determine whether or not the new feature includes multiple connected interactive components, and the UIMAM 406 executes processes in accordance with such determination as described above.

According to exemplary embodiments, when the determination module 420 determines that the effort to develop and test in a JavaScript library for building user interfaces (i.e., React web framework) is not more than two times the current source code corresponding to the current application, the determination module 420 may be configured to determine whether or not a team responsible for implementing the new feature is proficient in React web framework. When the determination module 420 determines that the team responsible for implementing the new feature is proficient in React web framework, the execution module 428 may be configured to implement the new feature in React and wrap.

For example, when the determination module 420 determines that an amount of source code to be developed and tested for building the new version of the application is more than two times the current source codes, the determination module 420 further determines whether the current application development could run in parallel with the new version of the application if the new feature is implemented into the current application. When the determination module 420 determines that the current application development could run in parallel with the new version of the application, the execution module 428 implements the new feature into the current application.

According to exemplary embodiments, when the determination module 420 determines that the team responsible for implementing the new feature may not be proficient in React web framework, the determination module 420 may be further configured to determine whether upskilling for team may be possible or not. When the determination module 420 determines that upskilling may be possible, the execution module 428 may be configured to implement the new feature in React and wrap. When the determination module 420 determines that upskilling may not be possible, the execution module 428 may be configured to implement the new feature in current technology.

FIG. 5A illustrates a flow chart for implementing a UI modernization application module in accordance with an exemplary embodiment.

It will be appreciated that the illustrated process 500A and associated steps may be performed in a different order, with illustrated steps omitted, with additional steps added, or with a combination of reordered, combined, omitted, or additional steps.

In the process 500A of FIG. 5A, at step S502, a request may be received to implement a new feature into a current application. At step S504, a database may be accessed that stores current source codes and components associated with the current application. At step S506, statistical data of the current source codes and the components may be collected from the database corresponding to the current application. At step S508, it may be determined whether or not an impact value regarding an impact on the current source codes in implementing the new feature into the current application exceeds a predetermined threshold value. According to exemplary embodiments, the predetermined threshold value may be a value that represents a 70% impact on the current source codes, but the disclosure is not limited thereto.

According to exemplary embodiments, when it is determined at step S508 that the impact value exceeds the predetermined threshold value, the process 500A proceeds to step S510 where it may be determined whether or not current application development could run in parallel with a new version of the application if the new feature is implemented into the current application.

According to exemplary embodiments, when it is determined at step S510 that current application development could run in parallel with the new version of the application, at step S512, the new feature may be implemented into the current application. At step S514, current application changes may be maintained to minimum.

According to exemplary embodiments, when it is determined at step S510 that current application development could not run in parallel with the new version of the application, at step S516, current backlog data may be re-prioritized regarding application development and the process 500A may implement the new feature into the current application based on the re-prioritized backlog data.

According to exemplary embodiments, when it is determined at step S510 that current application development could not run in parallel with the new version of the application, at step S518, the process 500A may request additional development resource data and implement the new feature into the current application based on the additional development resource data.

According to exemplary embodiments, when it is determined at step S508 that the impact value does not exceed the predetermined threshold value, at step S521, the process 500A proceeds to step S522 of FIG. 5B.

FIG. 5B illustrates another flow chart for implementing a UI modernization application module in accordance with an exemplary embodiment.

It will be appreciated that the illustrated process 500B and associated steps may be performed in a different order, with illustrated steps omitted, with additional steps added, or with a combination of reordered, combined, omitted, or additional steps.

In the process 500B of FIG. 5B, at step S522, it may be determined that the impact value is less than the predetermined threshold value (i.e., less than 70%).

According to exemplary embodiments, when at step S522 it is determined that the impact value is less than the predetermined threshold value (i.e., less than 70%), the process 500B may proceed to step S524 where it may be determined whether or not effort to develop and test in a JavaScript library for building user interfaces (i.e., React web framework) is more than two times the current source code corresponding to the current application.

When at step S524 it, is determined that the effort to develop and test in a JavaScript library for building user interfaces (i.e., React web framework) is more than two times the current source code corresponding to the current application, at step S528, it may be determined whether or not the new feature includes multiple connected interactive components.

When at step S528 it is determined that the new feature does not include multiple connected interactive components, at step S536, the process 500B may receive web-components from UI toolkit and implement the new feature into the current application based on the received web-components.

According to exemplary embodiments, when at step S528 it is determined that the new feature includes multiple connected interactive components, at step S538, the process 500B may implement the new feature into the current application (i.e., current technology).

According to exemplary embodiments, at step S524, when it is determined that the effort to develop and test in a JavaScript library for building user interfaces (i.e., React web framework) is not more than two times the current source code corresponding to the current application, at step S526, the process 500B may determine whether or not a team responsible for implementing the new feature is proficient in React web framework. When at step S526 it is determined that the team responsible for implementing the new feature is proficient in React web framework, at step S534, the process 500B may implement the new feature in React and wrap.

According to exemplary embodiments, when at step S526 it is determined that the team responsible for implementing the new feature may not be proficient in React web framework, at step S530, it may be determined whether upskilling for team may be possible or not. When at step S530 it is determined that upskilling may be possible, at step S534, the process 500B may implement the new feature in React and wrap. When at step S530 it is determined that upskilling may not be possible, the process 500B may implement the new feature in current technology (i.e., the current application).

According to exemplary embodiments, a non-transitory computer readable medium may be configured to store instructions for implementing the UIMAM 406, but the disclosure is not limited thereto. According to exemplary embodiments, the instructions, when executed, may cause a processor embedded within the UIMAM 406 to perform tire following: receiving a request to implement a new feature into a current application; accessing a database that stores current source codes and components associated with the current application; receiving statistical data of the current source codes and the components from the database corresponding to the current application; determining whether an impact value regarding an impact on the current source codes in implementing the new feature into the current application exceeds a predetermined threshold value; when it is determined that the impact value exceeds the predetermined threshold value, determining whether current application development could run in parallel with a new version of the application if the new feature is implemented into the current application; and when it is determined that current application development could run in parallel with the new version of the application, implementing the new feature into the current application. The processor may be the same or similar to the processor 104 as illustrated in FIG. 1 or the processor embedded within UIMAD 202, UIMAD 302, UIMAM 306, and UIMAM 406.

According to exemplary embodiments, wherein, when it is determined that the current application development could not run in parallel with the new version of the application, the instructions, when executed, may further cause the processor 104 to perform the following: re-prioritizing current backlog data regarding application development; and implementing the new feature into the current application based on the re-prioritized backlog data.

According to exemplary embodiments, the instructions, when executed, may further cause the processor 104 to perform the following: requesting additional development resource data; and implementing the new feature into the current application based on the additional development resource data.

According to exemplary embodiments, wherein, when it is determined that the impact value is less than the predetermined threshold value, the instructions, when executed, may further cause the processor 104 to perform the following: determining whether the new feature includes multiple connected interactive components; and implementing the new feature into the current application when it is determined that the new feature includes multiple connected interactive components.

According to an additional aspect of the present disclosure, wherein, when it is determined that the impact value is less than the predetermined threshold value, the instructions, when executed, may further cause the processor 104 to perform the following: determining whether the new feature includes multiple connected interactive components; receiving web-components from UI toolkit when it is determined that the new feature does not include multiple connected interactive components; and implementing the new feature into the current application based on the received web-components.

According to exemplary embodiments as disclosed above in FIGS. 1-5B, technical improvements effected by the instant disclosure may include platforms for implementing a UI modernization application module for obtaining feedback data regarding implementing a new feature into a current application based on several key data, including but not limited thereto, current technology stack data, current ADA implementation data, current team skills set data, time estimate data on conversion of the application and components, and team size data, thereby improving functionality of a current application, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly; the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. Tins disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a user interface (UI) modernization application module by utilizing one or more processors and one or more memories, the method comprising:
   receiving a request to implement a new feature into a current application;
   accessing a database that stores current source codes and components associated with the current application;
   receiving statistical data of the current source codes and the components from the database corresponding to the current application;
   determining an impact value regarding an impact on the current source codes in implementing the new feature into the current application;
   in response to the impact value exceeding a predetermined threshold value and in response to the components of the current application executable in parallel with a new version of the current application with the new feature, implementing the new feature into the current application; and
   in response the impact value being less than the predetermined threshold value and in response to the new feature including multiple connected interactive components, implementing the new feature into the current application.

2. The method according to claim 1, wherein, when it is determined that the components of the current application could not run in parallel with the new version of the current application, the method further comprising:
   re-prioritizing current backlog data regarding the current application; and
   implementing the new feature into the current application based on the re-prioritized backlog data.

3. The method according to claim 2 further comprising:
　requesting additional development resource data; and
　implementing the new feature into the current application based on the additional development resource data.

4. The method according to claim 1, wherein the predetermined threshold value is a value that represents a 70% impact on the current source codes.

5. The method according to claim 1 further comprising:
　receiving web-components from UI toolkit when it is determined that the new feature does not include the multiple connected interactive components; and
　implementing the new feature into the current application based on the received web-components.

6. The method according to claim 1, wherein, when it is determined that an amount of source code to be developed and tested for building the new version of the current application is more than two times that of the current source codes, the method further comprising:
　determining whether the components of the current application could run in parallel with the new version of the current application if the new feature is implemented into the current application; and
　when it is determined that the components of the current application could run in parallel with the new version of the current application, implementing the new feature into the current application.

7. A system for implementing a user interface (UI) modernization application module, the system comprising:
　a database including memories that store current source codes and components associated with a current application; and
　a processor operatively connected to the database via a communication network, wherein the processor is configured to:
　　receive a request to implement a new feature into the current application;
　　access the database to receive statistical data of the current source codes and the components from the database corresponding to the current application;
　　determine an impact value regarding an impact on the current source codes in implementing the new feature into the current application;
　　in response to the impact value exceeding a predetermined threshold value and in response to the components of the current application executable in parallel with a new version of the current application with the new feature, implement the new feature into the current application; and
　　in response the impact value being less than the predetermined threshold value and in response to the new feature including multiple connected interactive components, implement the new feature into the current application.

8. The system according to claim 7, wherein, when it is determined that the components of the current application could not run in parallel with the new version of the current application, the processor is further configured to:
　re-prioritize current backlog data regarding the current application; and
　implement the new feature into the current application based on the re-prioritized backlog data.

9. The system according to claim 8, wherein the processor is further configured to:
　request additional development resource data; and
　implement the new feature into the current application based on the additional development resource data.

10. The system according to claim 7, wherein the predetermined threshold value is a value that represents a 70% impact on the current source codes.

11. The system according to claim 7, wherein the processor is further configured to:
　receive web-components from UI toolkit when it is determined that the new feature does not include the multiple connected interactive components; and
　implement the new feature into the current application based on the received web-components.

12. The system according to claim 7, wherein, when it is determined that an amount of source code to be developed and tested for building the new version of the current application is more than two times that of the current source codes, the processor is further configured to:
　determine whether the components of the current application could run in parallel with the new version of the current application if the new feature is implemented into the current application; and
　when it is determined that the components of the current application could run in parallel with the new version of the current application, implement the new feature into the current application.

13. A non-transitory computer readable medium storing instructions for implementing a user interface (UI) modernization application module, wherein, when executed, the instructions cause a processor to perform the following:
　receiving a request to implement a new feature into a current application;
　accessing a database that stores current source codes and components associated with the current application;
　receiving statistical data of the current source codes and the components from the database corresponding to the current application;
　determining an impact value regarding an impact on the current source codes in implementing the new feature into the current application;
　in response to the impact value exceeding a predetermined threshold value and in response to the components of current application executable in parallel with a new version of the current application with the new feature, implementing the new feature into the current application; and
　in response to the impact value being less than the predetermined threshold value and in response to the new feature including multiple connected interactive components, implementing the new feature into the current application.

14. The non-transitory computer readable medium according to claim 13, wherein, when it is determined that the components of the current application development could not run in parallel with the new version of the current application, the instructions, when executed, further cause the processor to perform the following:
　re-prioritizing current backlog data regarding the current application; and
　implementing the new feature into the current application based on the re-prioritized backlog data.

15. The non-transitory computer readable medium, according to claim 14, wherein, when executed, the instructions further cause a processor to perform the following:
　requesting additional development resource data; and
　implementing the new feature into the current application based on the additional development resource data.

16. The lion-transitory computer readable medium according to claim 13, wherein the predetermined threshold value is a value that represents a 70% impact on the current source codes.

17. The non-transitory computer readable medium according to claim 13, wherein, the instructions, when executed, further cause the processor to perform the following:
- receiving web-components from UI toolkit when it is determined that the new feature does not include the multiple connected interactive components; and
- implementing the new feature into the current application based on the received web-components.

\* \* \* \* \*